US008641106B2

(12) United States Patent  
Probasco et al.

(10) Patent No.: US 8,641,106 B2  
(45) Date of Patent: Feb. 4, 2014

(54) AIRCRAFT CONTROL SURFACE GUST LOCK

(75) Inventors: Max A. Probasco, Plano, TX (US); Michael J. Schipper, Murphy, TX (US); Steve Ruzic, Garland, TX (US)

(73) Assignee: AirGizmos, LP, Richardson, TX (US)

( * ) Notice: Subject to any disclaimer, the term of this patent is extended or adjusted under 35 U.S.C. 154(b) by 588 days.

(21) Appl. No.: 12/180,349

(22) Filed: Jul. 25, 2008

(65) Prior Publication Data

US 2010/0019097 A1    Jan. 28, 2010

(51) Int. Cl.
*E05C 19/18*  (2006.01)
*B65D 45/30*  (2006.01)

(52) U.S. Cl.
USPC ............ 292/288; 292/258; 292/289; 244/1 R; 244/110 R; 244/129.1

(58) Field of Classification Search
USPC ......... 292/258, 288–290, 292, 295, 296–298, 292/DIG. 16, 307 R; 70/14, 19, 30, 49, 77, 70/78, 85, 201, 202, 205, 211; 244/1 R, 244/224, 87, 1 N, 110 R, 129.1; 24/170, 302, 24/457, 458
See application file for complete search history.

(56) References Cited

U.S. PATENT DOCUMENTS

| | | | | |
|---|---|---|---|---|
| 1,502,933 A | * | 7/1924 | Allen | 70/253 |
| 1,876,881 A | * | 9/1932 | Durant | 292/288 |
| 2,440,798 A | * | 5/1948 | Hardwick | 292/288 |
| 3,016,827 A | * | 1/1962 | Boyd | 102/384 |
| D218,143 S | * | 7/1970 | Kinder et al. | D8/499 |
| 4,208,026 A | | 6/1980 | Reynolds | |
| 4,418,881 A | * | 12/1983 | Bouldin | 244/224 |
| 4,678,214 A | * | 7/1987 | Cohn et al. | 292/213 |
| 5,005,527 A | * | 4/1991 | Hatfield | 119/793 |
| 5,253,908 A | * | 10/1993 | Leonard, III | 292/289 |
| 5,501,494 A | * | 3/1996 | Willetts | 292/262 |
| 5,542,723 A | * | 8/1996 | Scharf | 292/289 |
| 5,713,539 A | | 2/1998 | Russ et al. | |
| 5,740,591 A | * | 4/1998 | Hopkins | 24/302 |
| 5,745,959 A | * | 5/1998 | Dodge | 24/68 SK |
| 5,794,871 A | * | 8/1998 | Willetts | 292/288 |
| 5,810,404 A | * | 9/1998 | Horne et al. | 292/288 |
| 5,901,418 A | * | 5/1999 | Hopkins | 24/302 |
| 6,250,589 B1 | | 6/2001 | Russ et al. | |
| 6,401,310 B1 | * | 6/2002 | Warner et al. | 24/179 |
| 7,316,086 B2 | * | 1/2008 | Schuling et al. | 40/584 |

* cited by examiner

*Primary Examiner* — Carlos Lugo
*Assistant Examiner* — Alyson M Merlino
(74) *Attorney, Agent, or Firm* — Keith E. Taber

(57) ABSTRACT

Embodiments of the present disclosure generally provide a device for securing the external control surfaces of an aircraft. A gust lock is described for securing the control surfaces of an aircraft that includes an elongated top plate having a rotably associated strap lock, an elongated bottom plate having a rotably mounted capture piece, and a strap running from the capture piece through the strap lock to a tail section.

4 Claims, 7 Drawing Sheets

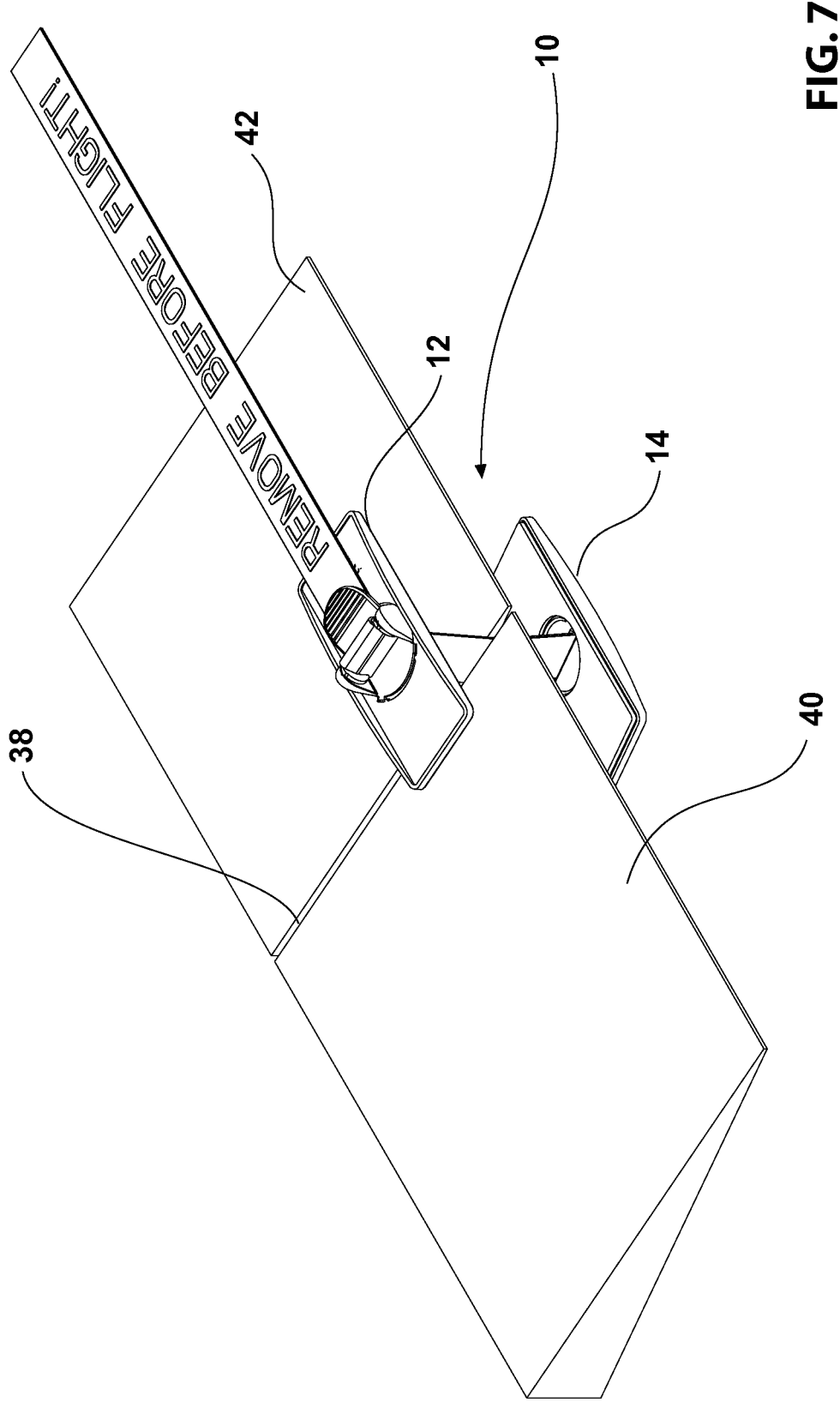

AIRCRAFT CONTROL SURFACE GUST LOCK

The disclosure relates generally to the field of limiting the movement of aircraft control surfaces while an aircraft is not in operation, and in particular to devices and methods used to prevent unintended movement of aircraft control surface.

BACKGROUND

In aircraft, flight control surfaces are used to control the motion of the aircraft though the air. These control surfaces direct airflow to affect pitch, roll, and yaw of the aircraft and are operated though cockpit controls. The roll and pitch are primarily controlled by either a control yoke or a stick. A rudder that controls the yaw is controlled by rudder petals. Other control surfaces may also be employed such as the V-tail ruddervator, flaperon, or elevons. Additionally, an aircraft may have wing flaps for altering the wing shape, and slats, spoilers and air brakes for slowing the aircraft.

While control surfaces are key to an aircraft operation while moving though the air, the surfaces are subject to wind forces while the aircraft is stationary. To keep the surfaces from moving while the aircraft is not in operation, a device known as a gust lock is used. A gust lock is used to keep the control surfaces and linkages from damage due to wind. Many gust locks on commercial aircraft are internal to the aircraft and use a pin on the yoke. Some have suggested using a cord tied to the internal yokes to prevent aileron movement. While both the yoke pin and cords are useful, the rudder in these cases is not protected. To assist in the protection of ailerons and rudders, others have devised a cord that tied to both the yoke and the rudders to restrict movement. Aircraft that use a control stick must restrict the stick internally or use external gust locks. Internal gust locks can be large and cumbersome, adding unwanted weight to the aircraft. An internal gust lock does restrict movement but may cause stress on the internal control linkage.

The typical external gust lock will use some type of leverage between a fixed surface and the movable control surface to stabilize the movement. While there are many variations of the external gust lock device, none of the present field employs a method for securing multiple types of control surfaces.

SUMMARY

Embodiments of the present disclosure generally provide a device for securing the external control surfaces of an aircraft.

A gust lock is described for securing the control surfaces of an aircraft that includes an elongated top plate having a rotably associated strap lock, an elongated bottom plate having a rotably mounted capture piece, and a strap running from the capture piece through the strap lock to a tail section.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 6 provides an isometric view of a gust lock being placed along the seam between a structural portion of a wing and a control surface on a wing; and.

FIG. 7 provides an isometric view of a gust lock being placed across the seam between a structural portion of a wing and a control surface on a wing.

DETAILED DESCRIPTION

The present disclosure generally provides gust lock mechanism for securing aircraft control surfaces comprising of a set of plates associated with a strap wherein the strap can be locked into a locking mechanism on the plate. For the purpose of this disclosure, an aircraft aileron will be used as an example of an aircraft control surface although installation may be extended to any movable control surface used on an aircraft.

Figure 1:
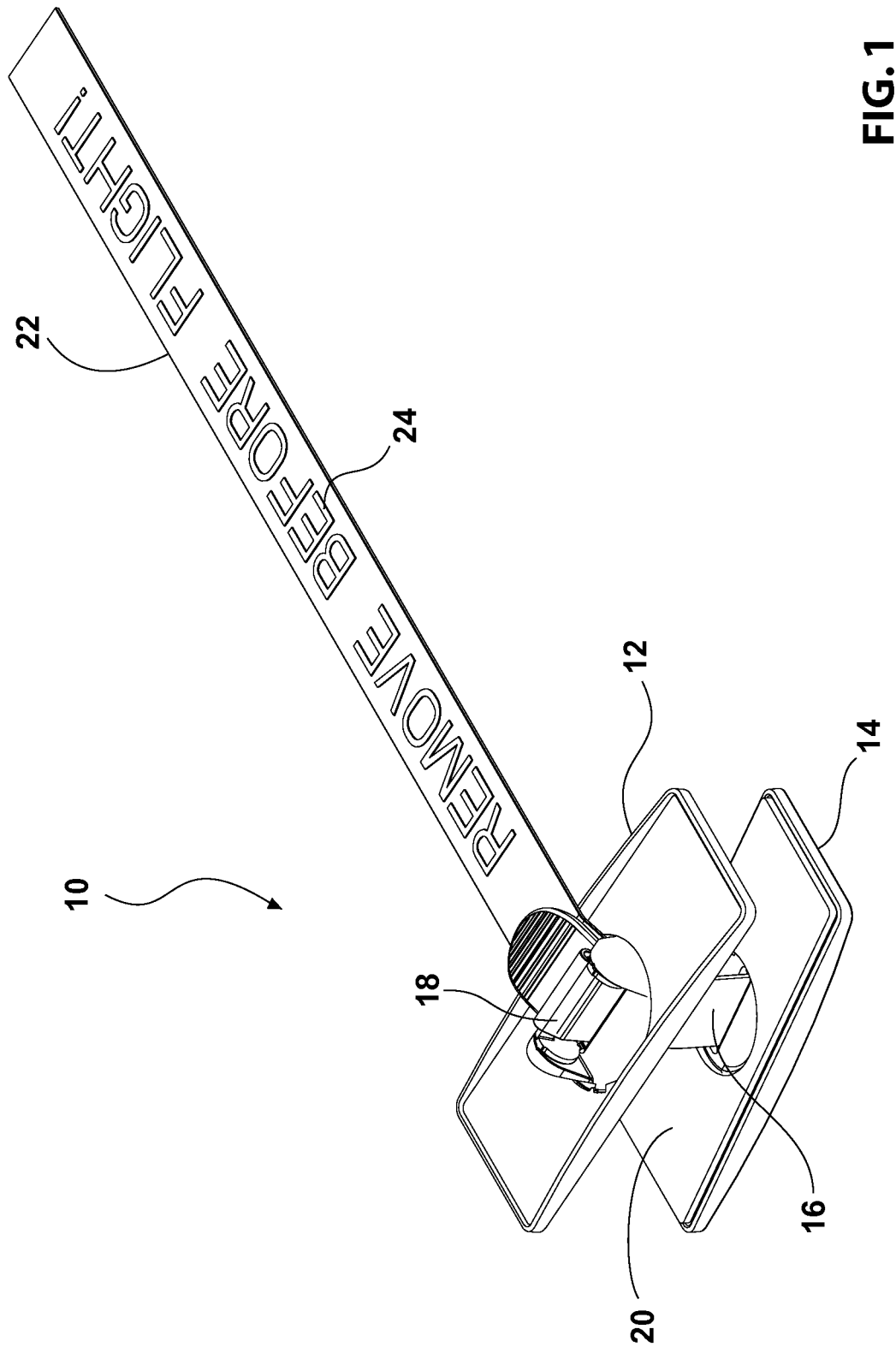
FIG. 1 provides an isometric view from the top side of a gust lock.

FIG. 1 provides an isometric view from the top side of a gust lock 10. The basic elements of the gust lock 10 include a top plate 12, a bottom plate 14, and a strap 16. The use of "top" and "bottom" is not meant to limit the usage of the device, but to provide a simple distinction between the two plates and the various views of the device. As is noted below, the device may be installed with the top plate 12 either above or below a horizontal control surface and the gust lock 10 is equally intended for installation on vertical control surfaces. Top plate 12 and bottom plate 14, collectively "Plates 12, 14", are made of fairly rigid material such as metal, rigid plastics, composites or other similarly rigid materials that are tough enough to handle the anticipated wear and tear. Top plate 12 includes a strap lock 18 through which strap 16 extends.

Plates 12, 14 include pads 20 which protect the aircraft from scratches or dents. Pads 20 are shown as attached to plates 12, 14 via adhesive. Pads 20 as shown are comprised of a compressible anti-slip material, such as foam rubber. Alternatively, pad 20 may be co-molded into plates 12, 14 or plates 12, 14 may be coated with a protective material through dipping or the protective material may be sprayed on to the plates 12, 14.

Strap 16 includes a tail section 22 with indicia 24. Indicia 24 will typically be a warning, as shown in the figures, that gust lock 10 must be removed prior to flight. Typically strap 16 will be red in color while indicia 24 is white in color as this is an industry standard for items to be removed from aircraft prior to flight. Nonetheless, other color combinations may be used as warranted. Strap 16 may be a woven nylon strap to provide sufficient clamping strength between plates 12, 14 and to provide a durable tail 22.

Figure 2:
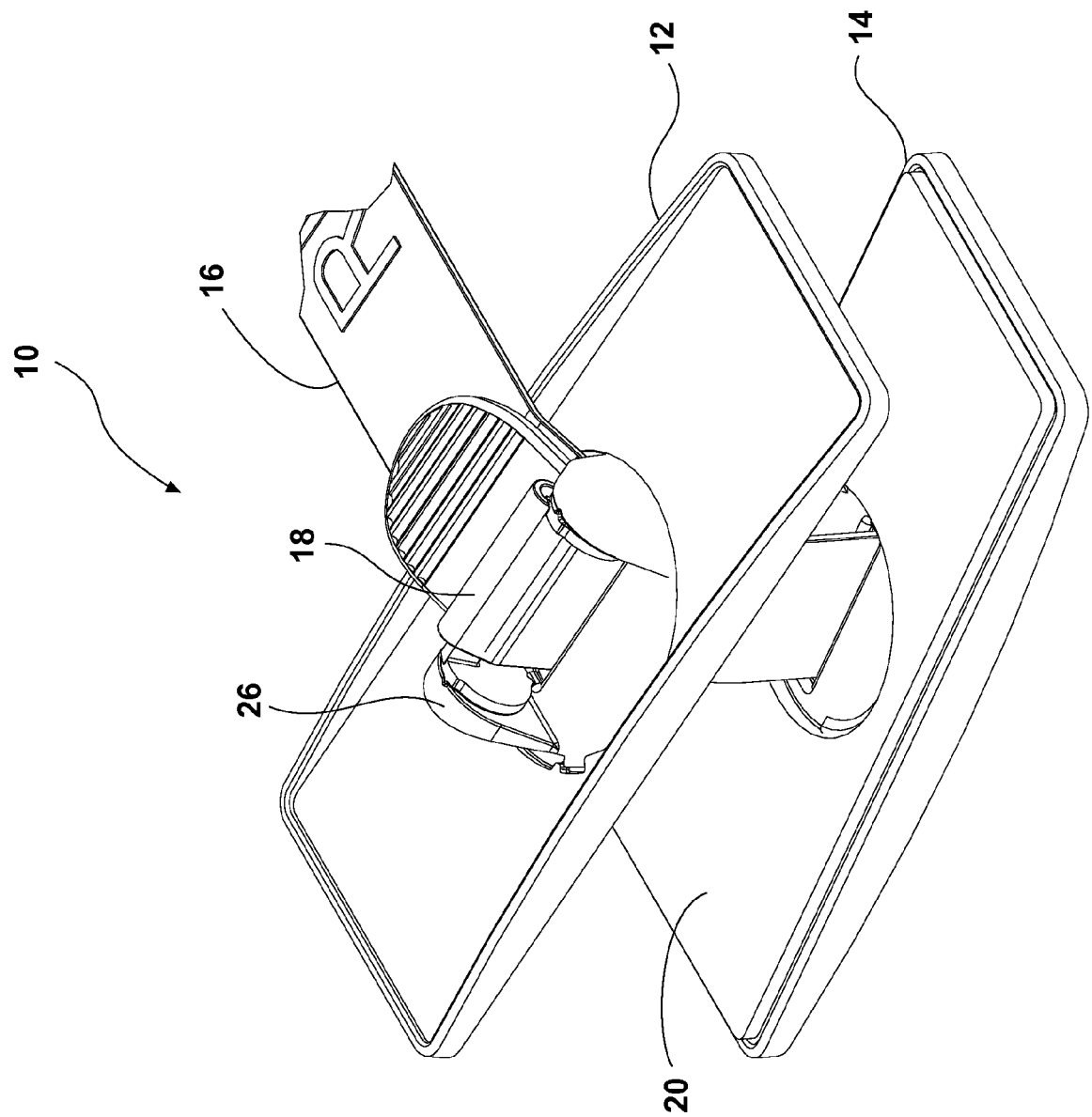
FIG. 2 provides a close up of the view in FIG. 1.

FIG. 2 provides a close up of the view in FIG. 1 of gust lock 10. Strap lock 18 is more clearly shown along with lock support 26 which supports strap lock 18 and rotably attaches strap lock 18 to top plate 12. This view also provides a good perspective on the shape of plates 12, 14. Plates 12, 14 are elongated rectangles, although any elongated shape will provide similar advantages. Plates 12, 14 are elongated to provide for positioning along control surfaces that are near other structures and therefore fit a wide variety of aircraft.

Figure 3:
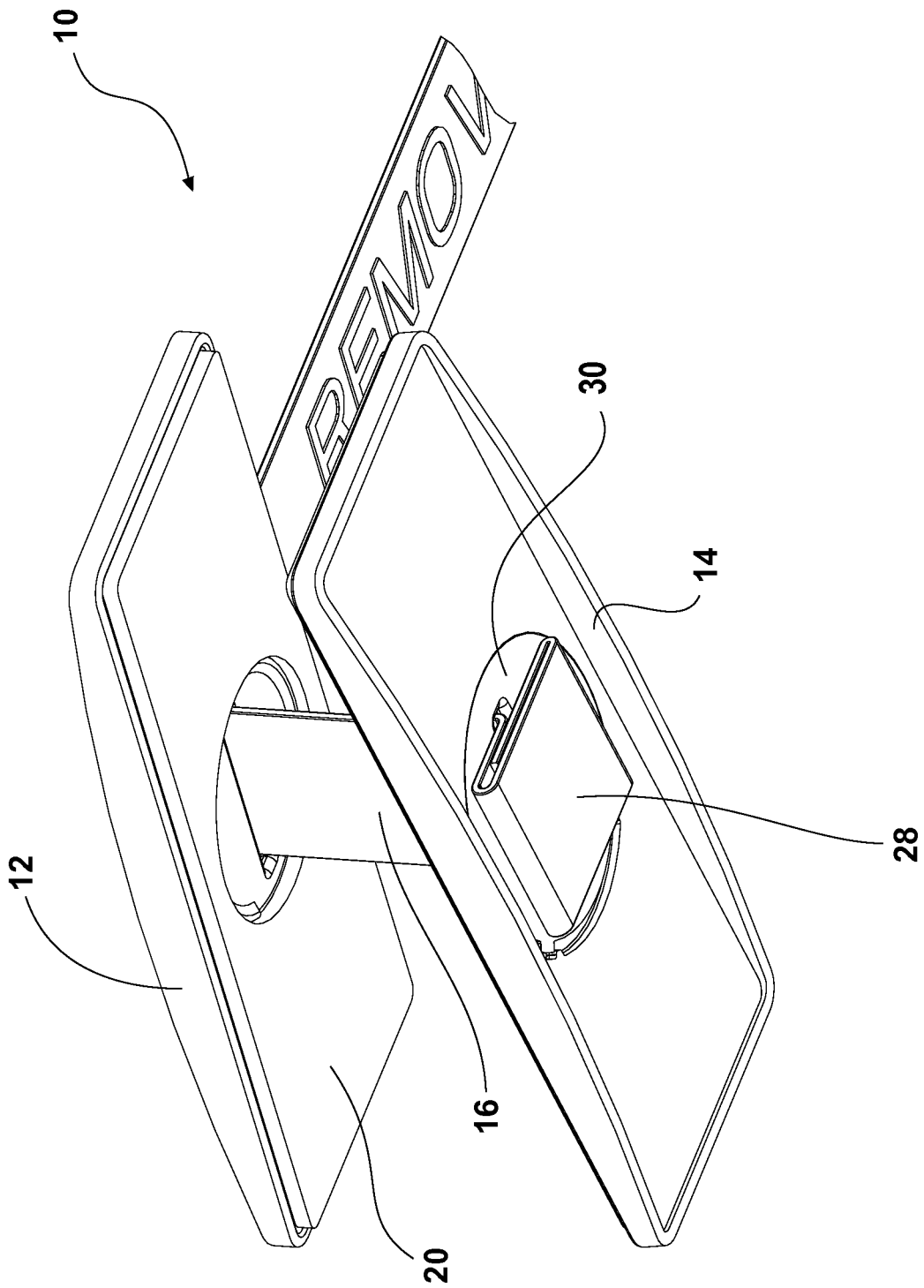
FIG. 3 provides a close up isometric view from the bottom side of a gust lock.

FIG. 3 provides a close up isometric view from the bottom side of a gust lock 10. This view clearly shows an end piece 28 of strap 16 extending through a rotable capture piece 30 in bottom plate 14. End piece 28 is shown as a fixed in a T-shape that is too large to fit through capture piece 30. End piece 28 may be fixed into a T-shape by sewing, gluing or other similar methods. Alternatively, End piece may be secured from slipping through capture piece 30 by other mechanisms such as a strap lock 18, locking pin, knot, or simply fixing end piece to capture piece 30. An advantage of the end piece 28 shown is that it allows for the removal of strap 16 from plates 12, 14 so that strap 16 may be replaced due to fading, abrasions, or other damage, thus increasing the life of gust lock 10 and improving safety. Capture piece 30 is rotable through at least ninety degrees relative to plate 14 to allow for varying placement of gust lock 10.

Figure 4:
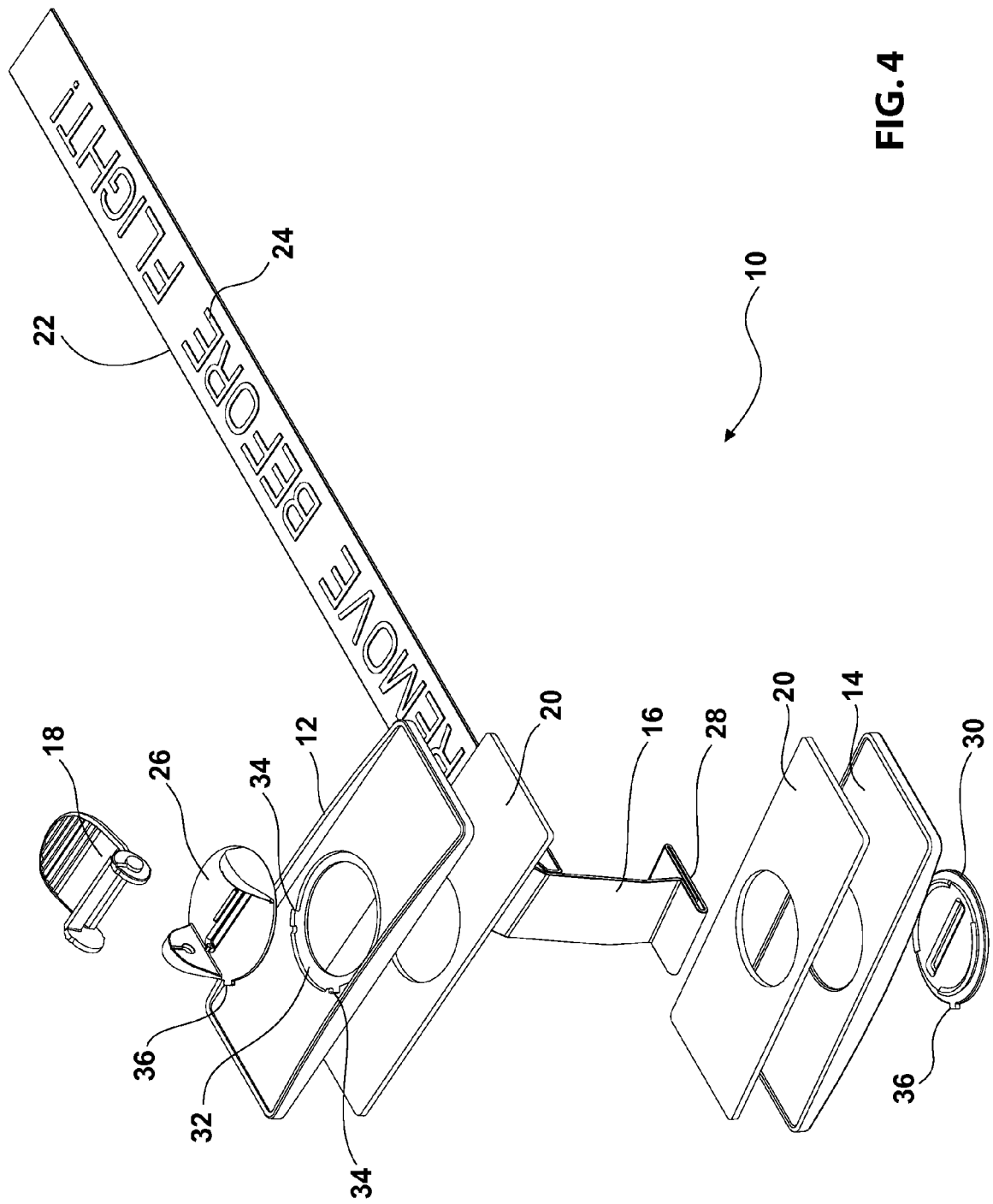
FIG. 4 provides an isometric exploded view from the tops side of a gust lock.

FIG. 4 provides an isometric exploded view from the top side of a gust lock 10 giving a clearer view of lock support 26 and slot 32 in top plate 12 that allows for a rotable connection between lock support 26 and top plate 12. To provide ease of installation slot 32 has two recesses 34 spaced ninety degrees apart. Lock support 26 includes tab 36 which fits into recesses 34 to provide for positive engagement at when the strap is aligned along the length of the top plate 12 or when the strap is aligned across the length of top plate 12.

Figure 5:
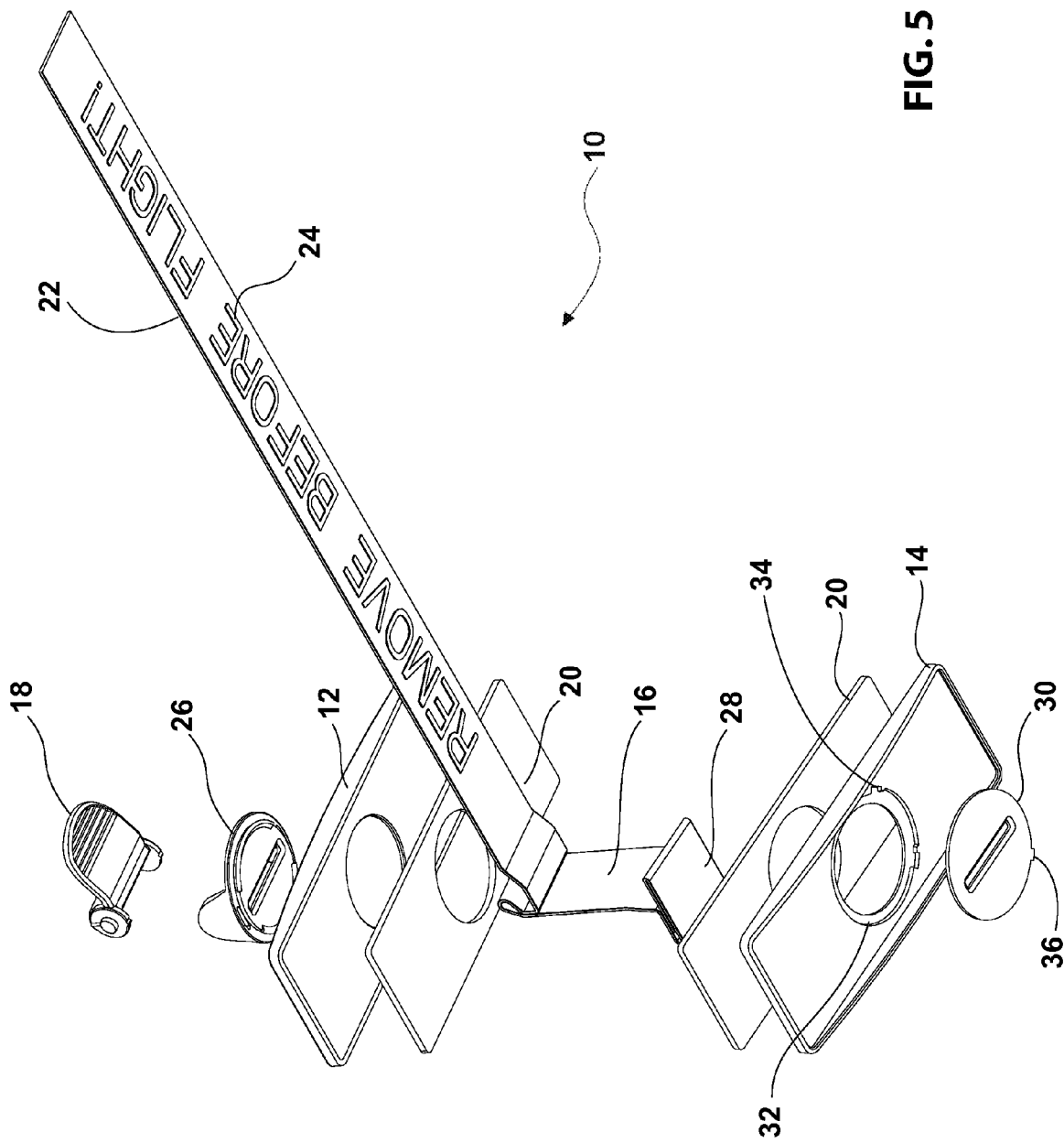
FIG. 5 provides an isometric exploded view from the bottom side of a gust lock.

FIG. 5 provides an isometric exploded view from the bottom side of a gust lock 10 to show that capture piece is rotably mounted to bottom plate 14 in a similar manner as lock support 26 is mounted to top plate 12. bottom plate has a slot 32 with spaced recesses 34 and capture piece 30 has a tab 36 to engage recesses 34 as described above.

Figure 6:
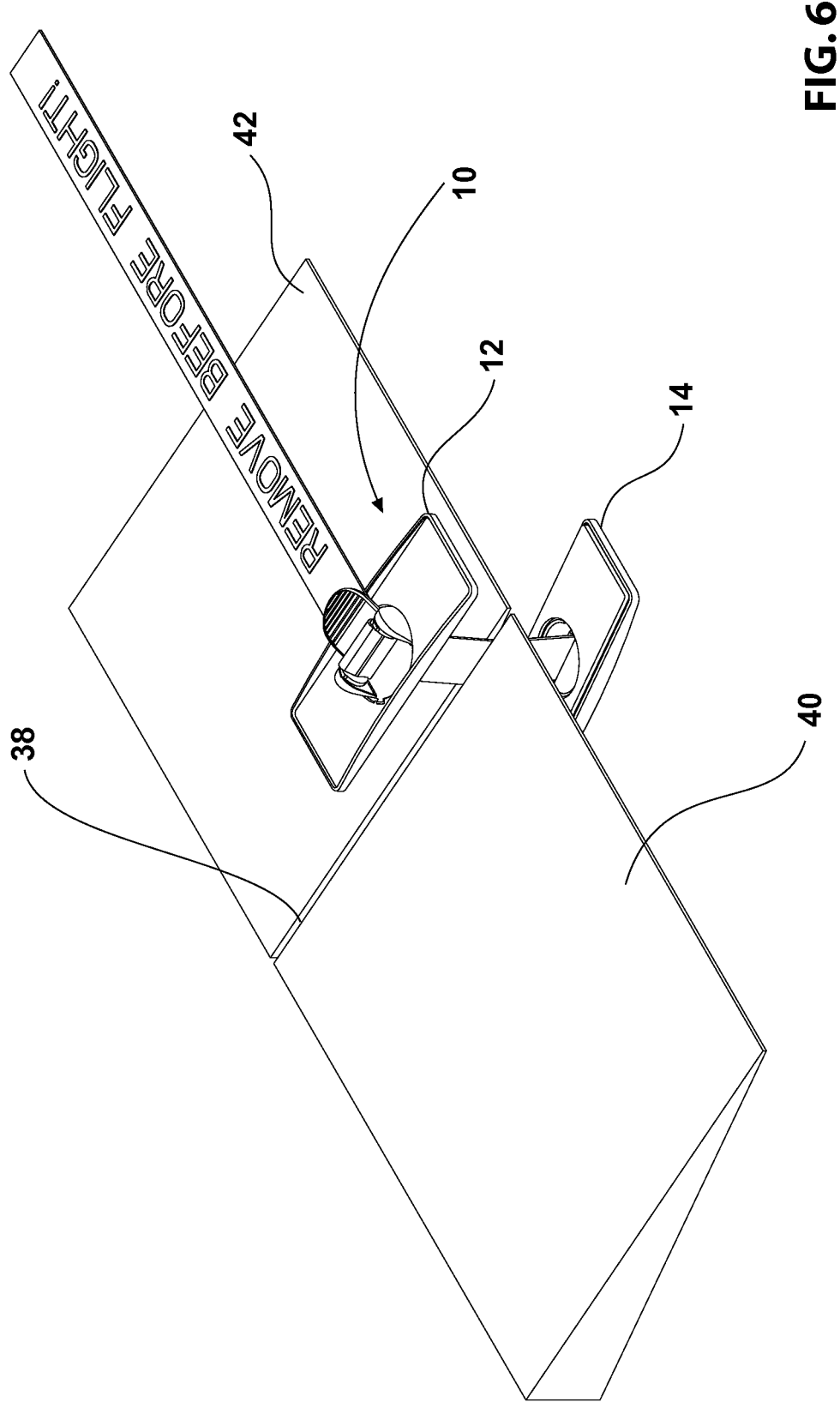

FIG. 6 provides an isometric view of a gust lock 10 being placed along a seam 38 between a structural portion 40 of a wing and a control surface 42 on a wing. Lock support 26 and capture piece 30 are rotated in slots 32 such that strap 16 is aligned with the length of plates 12, 14. In this configuration strap 16 is slid into seam 38 and plates 12, 14 are aligned along seam 38 providing clearance from any obstructions that may run near seam 38.

FIG. 7 provides an isometric view of a gust lock 10 being placed across a seam 38 between a structural portion 40 of a wing and a control surface 42 on a wing. Lock support 26 and capture piece 30 are rotated in slots 32 such that strap 16 is aligned across the length of plates 12, 14. In this configuration strap 16 is slid into seam 38 and plates 12, 14 are positioned across seam 38 providing clearance for short seams or other similar obstructions.

Additionally, the plates 12, 14 do not have to be aligned with each other and may be aligned opposite one another in some situations.

In operation, the alignment of the plates 12, 14 is chosen and lock support 26 and capture piece 30 are rotated accordingly. Strap lock 18 is released and sufficient strap is allowed between the plates 12, 14 to provide for easy installation. Plates 12, 14 are positioned as desired and tail section 22 is pulled through strap lock 18 to secure top plate 12 and bottom plate 14 on to the control surface 42 to be secured. Enough force is pulled on tail 22 to ensure a secure fit without damaging control surface 42. Strap lock 18 is flipped over to engage strap 16 and secure plates 12, 14 in place.

To release the gust lock 10 prior to flight strap lock 18 is flipped to release strap 16 and thereby loosen the compressive force between plates 12, 14. Plates 12, 14 are moved along seam 38 to pull strap 16 out of seam 38.

It may be advantageous to set forth definitions of certain words and phrases used in this patent document. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A gust lock system for locking a control surface of an aircraft and an adjacent structural portion, with a seam running between the control surface and the structural portion, said gust lock system comprising:
 a gust lock comprising:
  an elongated top plate having a lock support rotatably mounted to the top plate, said lock support allowing the top plate to run along the seam in an unlatched state or across the seam in a latched state;
  an elongated bottom plate having a rotatably mounted capture piece allowing the bottom plate to run along the seam in the unlatched state or across the seam in the latched state;
  a strap running from the capture piece through a strap lock pivotably mounted to the lock support to a tail section, the strap sized to fit within the seam and the strap lock securing the orientation of the top and bottom plates in the latched and unlatched states;
  compressible pads attached to the top plate and bottom plate; and
  an end piece formed in the strap to prevent the strap from passing through the capture piece.

2. A gust lock system for locking a control surface of an aircraft and an adjacent structural portion, with a seam running between the control surface and the structural portion, said gust lock system comprising:
 a gust lock comprising:
 an elongated top plate having a rotatably mounted lock support allowing the top plate to run along the seam in an unlatched state or across the seam in a latched state;
 an elongated bottom plate having a rotatably mounted capture piece allowing the bottom plate to run along the seam in the unlatched state or across the seam in the latched state; and
 a strap running from the capture piece through a strap lock pivotably mounted to the lock support to a tail section, the strap sized to fit within the seam and the strap lock securing the orientation of the elongated top plate and elongated bottom plate in the unlatched and latched states.

3. The gust lock system of claim 2 further comprising: compressible pads attached to the top plate and bottom plate.

4. The gust lock system of claim 2 further comprising: an end piece formed in the strap to prevent the strap from passing through the capture piece.

* * * * *